US009569679B1

United States Patent
Gray et al.

(10) Patent No.: US 9,569,679 B1
(45) Date of Patent: Feb. 14, 2017

(54) ADAPTIVE IMAGE SAMPLING FOR TEXT DETECTION

(71) Applicant: A9.com, Inc., Palo Alto, CA (US)

(72) Inventors: Douglas Ryan Gray, Mountain View, CA (US); Arnab Sanat Kumar Dhua, Mountain View, CA (US); Yu Lou, Stanford, CA (US); Ismet Zeki Yalniz, Amherst, MA (US)

(73) Assignee: A9.com, Inc., Palo Alto, CA (US)

( * ) Notice: Subject to any disclaimer, the term of this patent is extended or adjusted under 35 U.S.C. 154(b) by 366 days.

(21) Appl. No.: 13/693,542

(22) Filed: Dec. 4, 2012

(51) Int. Cl.
| | | |
|---|---|---|
| G06K 9/34 | (2006.01) | |
| G06K 9/18 | (2006.01) | |
| H04N 1/38 | (2006.01) | |
| H04N 1/387 | (2006.01) | |
| G06K 9/20 | (2006.01) | |
| G06T 7/00 | (2006.01) | |
| G06K 9/00 | (2006.01) | |
| G06K 9/46 | (2006.01) | |
| G06K 9/32 | (2006.01) | |

(52) U.S. Cl.
CPC .......... *G06K 9/18* (2013.01); *G06K 9/00456* (2013.01); *G06K 9/2054* (2013.01); *G06K 9/325* (2013.01); *G06K 9/4638* (2013.01); *G06T 7/0081* (2013.01); *H04N 1/38* (2013.01); *H04N 1/3872* (2013.01)

(58) Field of Classification Search
CPC .......... G06K 2209/01; G06K 9/00442; G06K 9/00449; G06K 9/00456; G06K 9/00463; G06K 9/2054; G06K 9/3233; G06K 9/325; G06K 9/3258; G06K 9/3266; G06K 9/46; G06K 9/4638; G06K 9/4642; G06K 9/4647; H04N 1/38; H04N 1/387; H04N 1/3872; G06T 7/004; G06T 7/0079; G06T 7/0081; G06T 2207/30176; G06F 17/21; G06F 17/211
USPC ................ 382/100–102, 105, 112–114, 173, 174,382/176, 177, 198–200, 282, 292, 293,382/321–325; 358/453, 462, 464; 715/246, 247, 715/254–256, 272, 273, 277
See application file for complete search history.

(56) References Cited

U.S. PATENT DOCUMENTS

| | | | | |
|---|---|---|---|---|
| 5,062,141 A | * | 10/1991 | Nakayama | G06K 9/32 382/174 |
| 5,613,016 A | * | 3/1997 | Saitoh | G06K 9/00463 382/174 |
| 5,680,478 A | * | 10/1997 | Wang et al. | 382/176 |
| 5,696,841 A | * | 12/1997 | Nakatsuka | G06K 9/3208 382/174 |

(Continued)

*Primary Examiner* — Eric Rush
(74) *Attorney, Agent, or Firm* — Hogan Lovells US LLP

(57) ABSTRACT

Various embodiments enable a device to perform an adaptive sampling method for locating text regions in images of natural scenes. Since only a fraction of pixels in an input image correspond to text regions, it is desirable to eliminate non-text regions early in the text detection process. Therefore, in at least one embodiment, an image is sampled horizontally to identify connected pixel regions indicative of text. In this example, each sampled row of the image is tested for containing Maximally Stable Extremal Regions (MSERs) in order to identify regions containing text. If a respective row contains a connected pixel region indicative of text, the neighboring rows are recursively sampled at finer levels in order to fully contain the text and sampling is terminated for regions which are unlikely to contain text. This sampling process can also be performed for the vertical dimension for regions which are determined to contain text.

22 Claims, 8 Drawing Sheets

(56) References Cited

U.S. PATENT DOCUMENTS

| | | | | |
|---|---|---|---|---|
| 5,892,842 | A * | 4/1999 | Bloomberg | G06K 9/32 382/173 |
| 6,243,419 | B1 * | 6/2001 | Satou et al. | 375/240.13 |
| 6,249,353 | B1 * | 6/2001 | Yoshida et al. | 382/176 |
| 6,470,094 | B1 * | 10/2002 | Lienhart et al. | 382/176 |
| 7,446,817 | B2 * | 11/2008 | Jung et al. | 382/229 |
| 7,817,856 | B2 * | 10/2010 | Yoshii | G06K 9/3266 382/176 |
| 8,620,080 | B2 * | 12/2013 | Ferman | G06K 9/3275 382/176 |
| 8,744,189 | B2 * | 6/2014 | Oh | G06K 9/325 382/177 |
| 2002/0102022 | A1 * | 8/2002 | Ma | G06K 9/00456 382/176 |
| 2003/0044068 | A1 * | 3/2003 | Kagehiro et al. | 382/182 |
| 2007/0286499 | A1 * | 12/2007 | Freiburg et al. | 382/229 |
| 2010/0202690 | A1 * | 8/2010 | Hwang et al. | 382/176 |

* cited by examiner

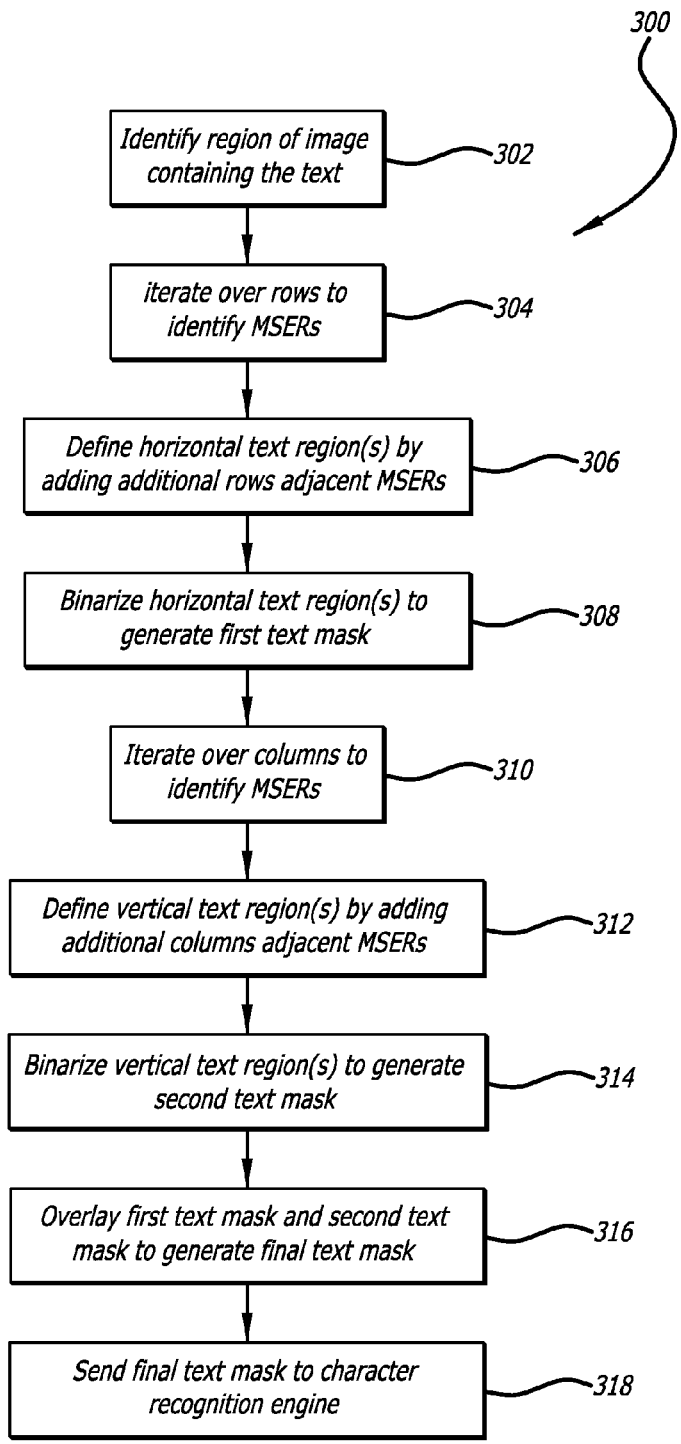

ADAPTIVE IMAGE SAMPLING FOR TEXT DETECTION

BACKGROUND

Optical character recognition (OCR) systems are generally used to detect text present in an image and to convert the detected text into its equivalent electronic representation. In order to accurately recognize text with a conventional OCR engine, the image typically needs to be of a high quality. The quality of the image depends on various factors such as the power of the lens, light intensity variation, relative motion between the camera and text, focus, and so forth. Generally, an OCR engine can detect a majority of text characters in good quality images, such as images having uniform intensity, no relative motion, and good focus. However, even with good quality images, conventional OCR engines are still often unable to accurately detect all text characters. This imprecision is further exacerbated when attempting to recognize text from lesser quality images, such as images containing variations in lighting, shadows, contrast, glare, blur, and the like. As technology advances and as people are increasingly using portable computing devices in a wider variety of ways, it can be advantageous to adapt the ways in which images are processed by an OCR engine in order to improve text recognition precision.

BRIEF DESCRIPTION OF THE DRAWINGS

Various embodiments in accordance with the present disclosure will be described with reference to the drawings, in which:

FIG. 3 illustrates an example process of recognizing text in accordance with at least one embodiment;

DETAILED DESCRIPTION

Figure 1:
FIG. 1 illustrates an example situation where a user is attempting to recognize text with a computing device in accordance with various embodiments.

Systems and methods in accordance with various embodiments of the present disclosure may overcome one or more of the aforementioned and other deficiencies experienced in conventional approaches to recognizing text in image data. In particular, various approaches enable a device to perform an adaptive sampling method for locating text regions in images of natural scenes. Since only a small fraction of pixels in a typical input image may correspond to text regions, it can be desirable to eliminate some or all of the non-text regions early in the text detection process. Therefore, in at least one embodiment, an image to be analyzed is sampled horizontally to identify connected pixel regions indicative of text, as text in many natural images will more often than not be substantially horizontal in direction. In this example, each sampled row of the image is tested to determine whether the row contains one or more Maximally Stable Extremal Regions (MSERs), which can help to identify regions likely containing text. If a respective row contains a connected pixel region indicative of text, the neighboring rows can be recursively sampled at finer levels in order to fully locate the region of the text. Sampling can also be terminated for regions determined to be unlikely to contain text. Such a sampling process can also be performed for the vertical dimension for the regions which are determined to contain text.

In at least one embodiment, a first text mask of an image, as may be captured with a camera of a computing device, containing text is generated. Generating the first text mask includes identifying regions of the image containing the text by uniformly sampling the image at a first rate. In this example, rows of the regions are iterated over at a second rate to identify MSER regions. Upon identifying one or more MSER regions, one or more horizontal text regions adjacent the one or more MSER regions are defined by including a predetermined number of additional rows of pixels above and/or below rows containing the one or more MSER regions. In this example, the horizontal text regions of the image are binarized to generate the first text mask of the image. A second text mask of the image is generated by separately identifying regions of the image containing the text and iterating over columns of the regions to separately identify one or more MSER regions. Upon identifying a MSER region, one or more vertical text regions adjacent the MSER region is separately defined by including a predetermined number of additional columns of pixels adjacent columns containing the MSER. In this example, the vertical text regions of the image are binarized to generate the second text mask. Accordingly, a final text mask of the image is generated by combining the first text mask and the second text mask and the final text mask is sent to a character recognition engine to recognize the text therein.

Various other functions and advantages are described and suggested below as may be provided in accordance with the various embodiments.

FIG. 1 illustrates an example situation 100 in which a user is attempting to recognize text in a live field of view of a camera of a computing device 102 on a window 104, in accordance with at least one embodiment. Although a smart phone is shown, it should be understood that various other types of electronic or computing devices that are capable of determining and processing input can be used in accordance with various embodiments discussed herein. These devices can include, for example, tablet computers, notebook computers, desktop computers, personal data assistants, electronic book readers, video gaming controllers, and portable media players, among others. The portable computing device 102 in this example includes a camera and an interface (e.g., a display element) that displays the field of view of the camera. The camera can include a lens and an image sensor that converts an optical image into an electrical signal. The portable computing device 102 can be aimed in different directions and the interface can display an image of the current/active field of view being captured by the camera. In accordance with at least one embodiment, instead of manually typing the phone number on the window 104 to call the business or manually typing the business name into a search engine of device's web browser, the user walking down a street could point the camera of at the text to recognize and subsequently provide the text to the phone application to initiate a call or to the browser as a shortcut to navigate the user thereto.

In this example, however, since the user is walking, obtaining an accurate OCR output can be a challenge. The outside world is filled with less than ideal conditions, such as poor or varied lighting, movement during image capture, and other circumstances, that make capturing an image ideal for processing by a conventional optical character recognizer (OCR) difficult. Further, given people's busy schedules, taking the time and care to capture an ideal image in a moving environment, such as in a user's hand, is not necessarily practical and likely not to be expected. Since only a small fraction of pixels in an input image correspond to text regions, it is desirable to eliminate non-text regions early in the text detection process.

Figure 2A:
FIGS. 2A-2F illustrate an example visual representation of a process of recognizing text in accordance with at least one embodiment.

Therefore, in at least one embodiment, an image is sampled horizontally to identify connected pixel regions indicative of text. A processing component of the computing device 102 processes the image in the active field of view of the camera to detect text in the image. FIG. 2A illustrates an example image 200 of an image captured by the camera of the computing device 102. For example, the processing component can implement algorithms that detect and recognize the location of text in the image 200. In accordance with an embodiment, detecting text regions in the image 200 can include locating regions of intensity extremes (e.g., regions of sharp transitions between pixel values) such as the edges of letters. The regions of extremes, or the Maximally Stable Extremal Regions (MSERs), can be extracted and analyzed to detect characters, where the detected characters can be connected and aggregated. A text line algorithm can be used to determine the presence and orientation of the connected characters. The sampling rate can depend on, for example, a minimum height and width of a connected pixel region, such as text, to be detected. Since the connected pixel regions, in this example, are individual text characters, the minimum height and width of the connected pixel regions can be defined, for example, to be 20 pixels and 4 pixels respectively when the resolution of the image 200 is 640×480 pixels. Oftentimes, commercial OCR engines tend to fail for character sizes smaller than 20 pixels. Therefore, in order not to miss any of the characters of a height equal to or larger than a predefined minimum height value (i.e. 20), rows of the identified regions can be defined and sampled as being 10 pixel high. Therefore, for each row sampled or scanned, one-dimensional MSER regions are extracted.

Figure 2B:
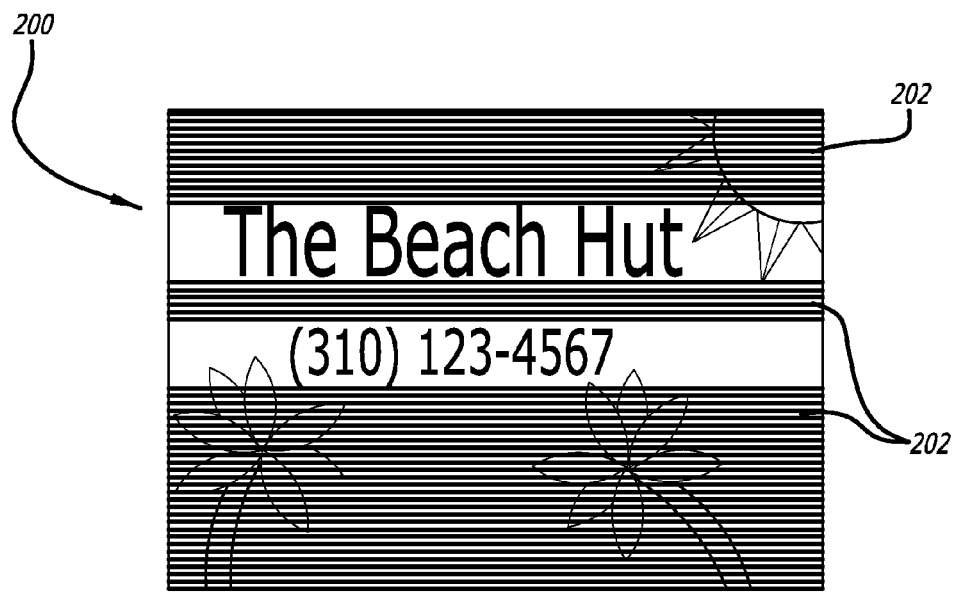

Accordingly, if a row includes a potential region of text by including at least three potential characters, then the corresponding MSER regions are relatively close together. The MSER regions are assumed to be close to each other if a succeeding region is closer than the width of the preceding region multiplied by a constant, in one example. If two regions are further away from each other more than a specified pixel distance, they are assumed to be disconnected regardless of the aforementioned proximity criterion. For example, FIG. 2B illustrates an example of the image 200 after a text line algorithm has been applied. In this example, the regions 202 have been discarded for not containing MSER regions that are relatively close together and meet the above-mentioned criteria. For example, parts of the image 200 corresponding to the palm tree and sun are discarded because they do not meet the prescribed assumptions of text. The problem then becomes a search for the longest sequence of one-dimensional MSER regions for a given row. If the longest chain has three or more one-dimensional MSER regions, then it is assumed that the row contains text. In accordance with an embodiment, pair finding can further include sorting the remaining glyphs (MSERs or connected pixel regions which appear to be characters) left to right, and all pairs which pass a test can be considered a possible character pair. The test compares the distance between glyphs, vertical overlap of two glyphs, their relative height, width, stroke width, and intensity. This analysis is done for every row sampled in the initial sampling stage and the rows which pass the initial test are forwarded to a recursive sampling stage.

The output of the initial sampling stage is a region or regions of the image 200 made up of a number of rows which are likely to contain text. In this example, the aim is to efficiently sample rows of the identified regions at finer levels and to produce character glyphs, or regions of similar grayscale values that fall within predefined size constraints. This can be achieved when the two adjacent regions bounded by a previous and to be sampled row are added to a stack for further sampling and investigation. This is done for all rows in the initial sampling stage if they are labeled to contain text. The stack now contains a list of intervals which designate the start and end coordinates of the image regions on the vertical axis. Each interval in the stack is popped and the row in the center of the interval is tested for containing any text. If the result is positive, then the two sub region divided by the center row are added to the stack as well. This is done recursively for all sampling intervals in the stack until the sampling interval contains a single row. At the end of the iteration, all the image regions which contain text are sampled horizontally and the regions which are very unlikely are left not sampled. The output of this stage is a list of labels for each row indicating whether it is sampled or not. This is forwarded the text region padding stage.

Figure 2C:

At the end of the recursive sampling, all the rows of the image 200 passing over any text with at least two characters are expected to be sampled, as shown in FIG. 2B. However, this is not always the case for certain words. For example, "pad" is a word where there are only one connected component along the rows passing over the upper part of letter "d" and the lower part of letter "p". Since there are less than three regions along those rows, certain parts of the letters will likely be classified as non-text at earlier stages of adaptive sampling. As a result, those characters will only be partially detected. This is not desirable because the entire character is necessary for robust character identification and classification. The solution, in this example, is to pad or add a predetermined number of additional rows of pixels above and/or below rows containing the one or more MSER regions where the rows are sampled densely. FIG. 2C illustrates an example after the image 200 has been padded. In this example, the regions 206 correspond to smaller versions of the discarded regions 202 of FIG. 2B in order to insure that certain parts of the letters are not classified as non-text by adding additional pixels on either side of the rows identified as containing text. For the case of the word "pad", only the middle zone is dense sampled because there are at least three one-dimensional MSER regions along each row in that region. Given the height h and start position s of each dense sampled region, all the rows positioned between (s−h/2) and (s+3h/2) are sampled and one-dimensional MSER regions are calculated if this is not already done before in the previous sampling stages.

Figure 2D:

Accordingly, the one-dimensional MSER regions extracted from the sampled rows of FIGS. 2B-2C are used to generate a two-dimensional binary mask of the image 200 as shown in FIG. 2D. This is simply done by printing all the one-dimensional MSER regions of all the sampled rows on the respective row of an output image and omitting regions 204 that are determined not to contain text. If there are overlapping one-dimensional MSER regions, the MSER regions are printed on top of each other. This results in an output image containing extremal regions which are maximally stable along the horizontal direction.

The ultimate aim is to extract character binary masks which are comparable to what a two-dimensional MSER algorithm produces for each character in a given input image. In two dimensions, MSER regions are extremal regions which satisfy stability condition in various directions and it is defined in terms of the change of total area over a predefined threshold of intervals. However, the stability criterion for one-dimensional MSER is defined in terms of the length of the regions in the one-dimensional space and this is independent from the neighboring pixels in the other rows or directions. Two-dimensional MSER is, therefore, more restrictive and sensitive for the color intensities over the entire MSER regions.

Given a two-dimensional image region of interest, the stability criterion is enforced at various directions and combined to generate character glyphs. This can be achieved by tracing the rows of pixels at arbitrary directions over the two-dimensional image region and overlaying or intersecting the resulting one-dimensional MSER regions on the final output image. If a pixel is labeled to be a part of any extremal region over all traces at different orientations, then the pixel is labeled to be an MSER region in two-dimensions as well in the final output mask. The observation is that there is no need to trace the image over many directions. It is sufficient to do the stability analysis over only two orientations: horizontal and vertical.

Figure 2E:
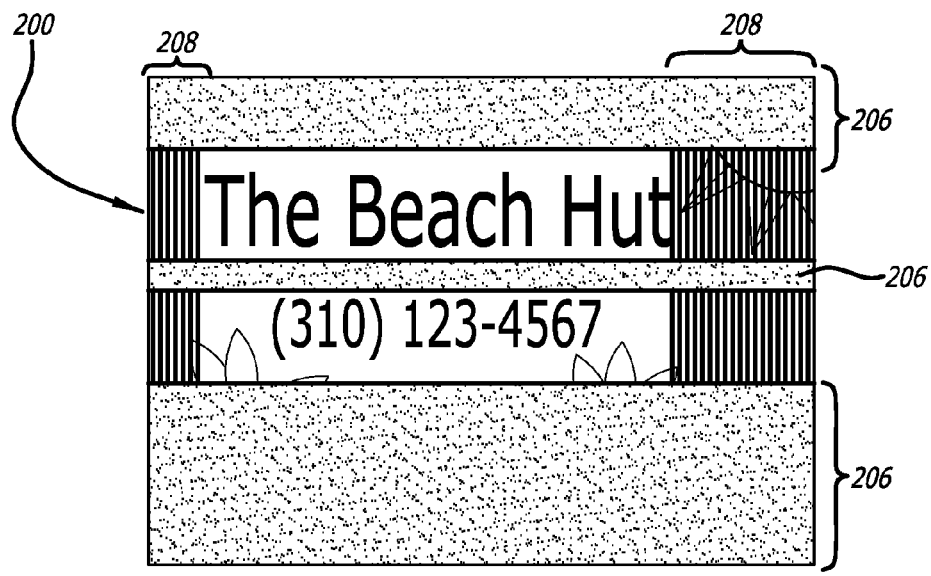
Figure 2F:

One could apply the vertical MSER analysis over the entire input image. However, this is not necessary since the horizontal MSER analysis stage already provides the image regions of interest which are likely to contain text. Moreover, we have prior information on the minimum character width to be detected. It is, therefore, sufficient to run the adaptive sampling approach over the columns of the candidate text regions as described in the horizontal MSER analysis stage. For example, this is shown in FIG. 2E. In this example, the adaptive sampling approach has been applied to the columns of the candidate text regions in order to discard the regions 208 in order to further define the region of text. In this example, the initial sampling rate in the vertical dimension is higher than it was in the horizontal MSER analysis because the minimum character width is expected to be smaller than the minimum character height (e.g. since the thinnest letters in the Latin alphabet, such as 'l', are much thinner than, for example, 'x'). Another modification for the adaptive sampling stage is that the component chaining is disabled. Observing at least one-dimensional MSER region along any column may be an indication of a text region in interest. If there is no one-dimensional MSER region along a column, then it is assumed that it does not contain any text and therefore there is no need for the recursive sampling around that column. At the end of the adaptive sampling of the candidate text regions in the vertical direction, a number of one-dimensional MSER regions are obtained. Those regions are overlaid with the output mask of the horizontal MSER analysis stage. If they both agree on stability, then the pixel is set to true in the final binary mask of the image 200, which is shown in FIG. 2F.

One problem is that the height of the candidate text regions can be smaller than the maximum ink size parameter defined in one-dimensional MSER analysis section. As a result, the output of the one-dimensional MSER for those text regions contains one-dimensional MSER regions which span the entire column regardless of the content of the candidate text region. The reason is that the length of the one-dimensional connected components reaches a maximum size at some threshold interval. The size does not change over a number of threshold intervals which makes the connected component stable. In order to eliminate these false positive one-dimensional MSER regions, the ratio of pixels which are horizontally stable along the vertical direction to the length of the tested one-dimensional MSER region are used. If this ratio is smaller than a certain threshold, then the one-dimensional MSER region is assumed to be a false positive and, therefore, ignored at subsequent stages.

The character regions do not need to satisfy the stability criterion in all directions. The color intensity may change gradually over the character image in any direction depending on the illumination and other factors. It is observed that using only the horizontal MSER analysis can be sufficient to produce character glyphs similar to what two-dimensional MSER produces. Therefore, the vertical analysis is optional.

FIG. 3 illustrates an example process 300 for recognizing text in an image with a computing device that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a first text mask of an image captured with a camera of a computing device containing text is generated. Generating the first text mask includes identifying 302 regions of the image containing the text by uniformly sampling the image at a first rate. In this example, rows of the regions are iterated over 304 at a second rate to identify MSER regions. Upon identifying one or more MSER regions, one or more horizontal text regions adjacent the one or more MSER regions are defined 306 by including a predetermined number of additional rows of pixels above and/or below rows containing the one or more MSER regions. In this example, the horizontal text regions of the image are binarized 308 to generate the first text mask of the image. A second text mask of the image is generated by separately identifying regions of the image containing the text and iterating 310 over columns of the regions to separately identify one or more MSER regions. Upon identifying a MSER region, one or more vertical text regions adjacent the MSER region is separately defined 312 by including a predetermined number of additional columns of pixels adjacent columns containing the MSER. In this example, the vertical text regions of the image are binarized 314 to generate the second text mask. Accordingly, a final text mask of the image is generated by overlaying or combining 316 the first text mask and the second text mask, where overlaying or combining, in one example, is an AND operation or the result of the intersection of the two masks. Subsequently, the final text mask is sent 318 to an optical character recognition (OCR) engine to recognize the text therein. Various other approaches can be used as well as discussed or suggested elsewhere herein.

In at least some embodiments, various assumptions about text can be made to aid in the detection process. For example, one assumption is that any text region is composed of at least three characters. This assumption can help eliminate false positive regions and help yield higher precision rates when determining text bounding boxes. If this assumption is not made, each small ridge or loop may be falsely identified as potentially being text. However, this assumption is optional and can be modified to accommodate the case where a word may contain only a single character. Further, text is also assumed to be aligned near-horizontally in the input images.

Figure 4:
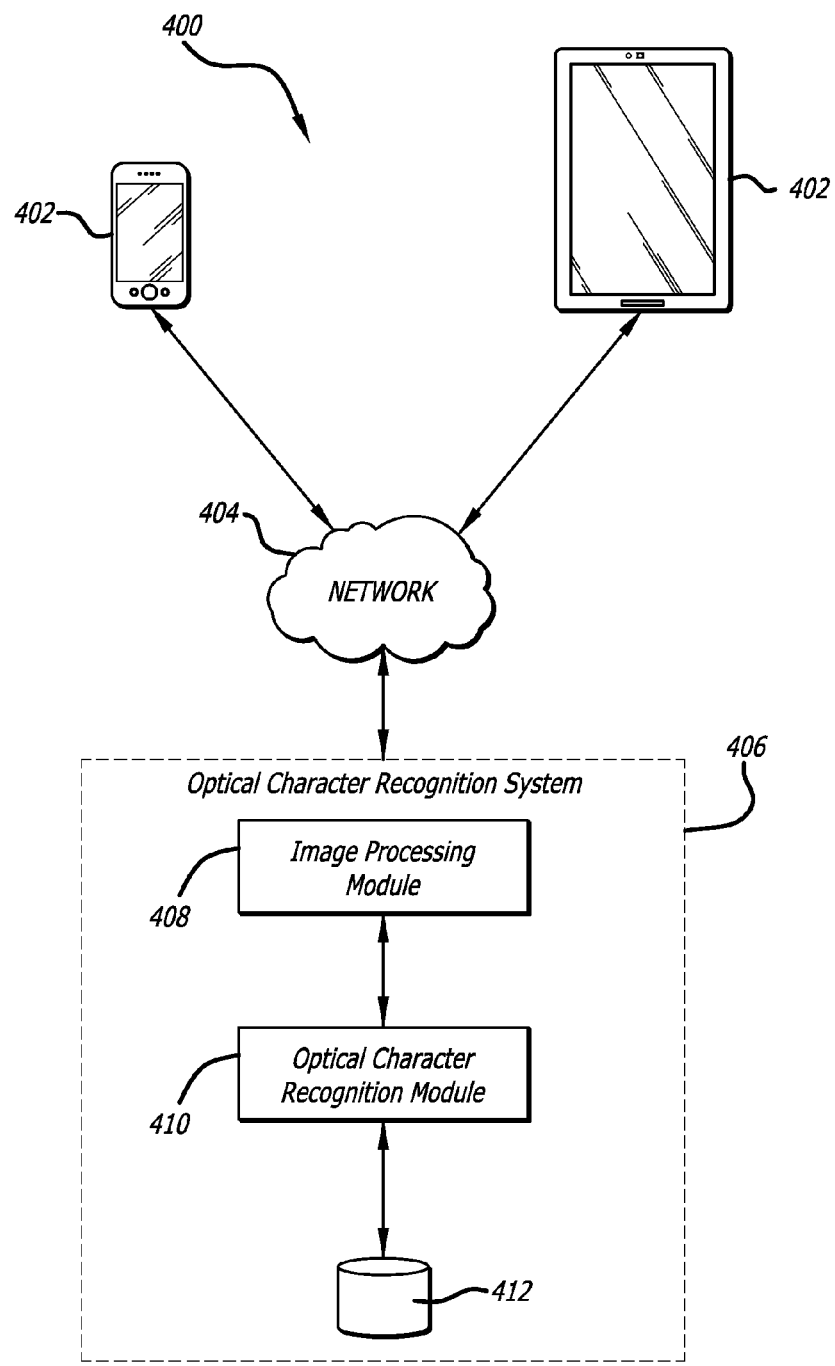
FIG. 4 illustrates an example environment in which various embodiments can be implemented.

FIG. 4 is an example environment 400 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to utilize a client device 402, such as a personal computer, tablet computer, smart phone, and the like, to access an Optical Character Recognition system or service 406 over at least one appropriate network 404, such as a cellular network, the Internet, or another such network for communicating digital information. The client device 402 can capture one or more images (or video) of text and send the images to the Optical Character Recognition system or service 406 over the at least one appropriate network 404. The Optical Character Recognition system 406 includes an image-processing module 408 that can apply different operators or techniques to pre-process the images before submitting the images to one or more optical character recognition modules 410. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition module 410 concurrently recognizes text from the image to produce multiple recognized text outputs. In at least one embodiment, a processor can analyze the recognized text using a database 412 of words in order to improve the recognition. The database 412 includes a set of words which the processor can search for matches corresponding to words present in the recognized text. At least a portion of these tasks can be performed on a portable computing device or by using at least one resource available across a network as well. In at least some embodiments, an OCR application will be installed on the client device 402, such that much of the processing, analyzing, or other such aspects can be executed on the client device. Various processing steps can be performed by the client device 402, by the Optical Character Recognition system 406, or a combination thereof. Therefore, it should be understood that the components and capabilities of the Optical Character Recognition system 406 could wholly or partly reside on the client device 402.

Further, detecting text in an image can include more or fewer steps as described above. For example, text detection in the image can include performing glyph detection on the image. The image can be separated into regions of similar grayscale values that fall within predefined size constraints called glyphs. Character classification can then be performed, where any glyphs that are not characters are removed using machine learning algorithms or other similar algorithms. Pair finding/word finding can then be performed, where the glyphs are grouped into words and lines, and baseline estimation can then be performed on the words and lines to estimate lines for the top and bottom points on the words. Word splitting can then be performed, where the spaces between the glyphs can be examined to decide word boundaries used for evaluation or display purposes. Binarization can then be performed, where the regions are binarized to produce a crisp mask which can include any punctuation that may have been filtered out earlier due to the minimum size constraint, for example.

The glyph detection can further include extracting maximally stable extremal (MSERs) regions from the image. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than three child regions, should be ignored.

Character classification can further include extracting features from each MSER, the features including: Bounding Box Aspect Ratio (width over height); Compactness (4 pi times area over perimeter squared); Raw Compactness (4 pi times number of pixels over perimeter squared); Stroke Width (estimated using distance transform) divided by width; Stroke Width (estimated using distance transform) divided by height; Solidity (area over bounding box area); Convexity (convex hull perimeter over perimeter); Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (i.e. a low false negative rate), but with a high false positive rate.

Further, pair finding can include sorting the remaining glyphs (MSERs which appear to be characters) left to right, and all pairs which pass a test can be considered a possible character pair. The test compares the distance between glyphs, vertical overlap of two glyphs, their relative height, width, stroke width, and intensity.

Accordingly, word line finding can further include treating each glyph as a vertex in a graph and each pair as an edge, then using an iterative dynamic programming algorithm to extract the best (e.g., the longest) sequence of edges, where the longest edges become word candidates. Additionally or alternatively, word line finding can include selecting glyphs from left to right after three glyphs are found to be in a good sequence.

Base line estimation can further include estimating the slope of the baseline using a clustering algorithm, and then computing intercepts that minimize the minimum distance between baselines and glyphs. Each word candidate can have at least two lines in the top and bottom points of the glyphs, and if two or more words appear to have the same baselines, they can be merged and the lines can be re-estimated. Further, in accordance with an embodiment, glyph refinement can be performed after baseline estimation is performed, where all glyphs that are classified as non-text, but fit into the baseline configuration, are included.

In accordance with an embodiment, word splitting can further include estimating the spaces between glyphs in each baseline and choosing a threshold, where any gap between characters greater than that threshold can be considered to be a word boundary (space) and can be marked as such.

In accordance with an embodiment, binarization can further include binarizing each region in the bounding box based at least in part on the threshold used to compute the regions character and the regions character's neighbors.

Figures 5A, 5B:
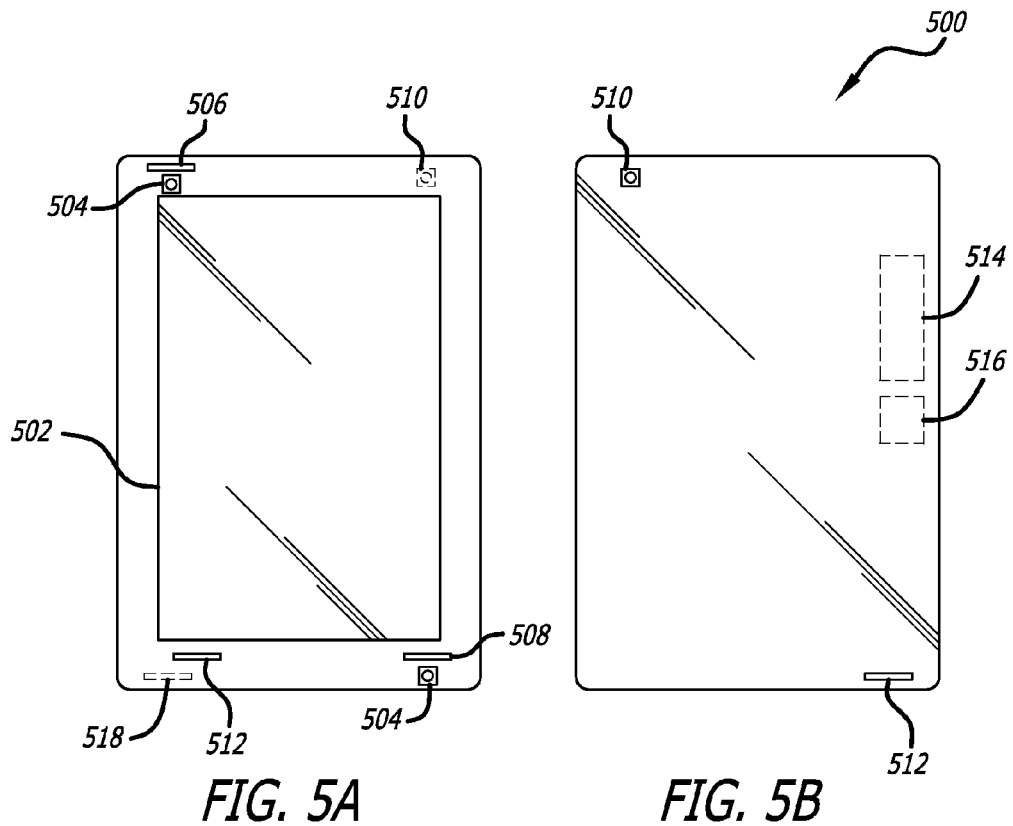
FIGS. 5A and 5B illustrate an example computing device that can be used to implement aspects of various embodiments.

FIGS. 5A and 5B illustrate front and back views, respectively, of an example electronic computing device 500 that can be used capture images and at least facilitate the recognition of text therein, in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
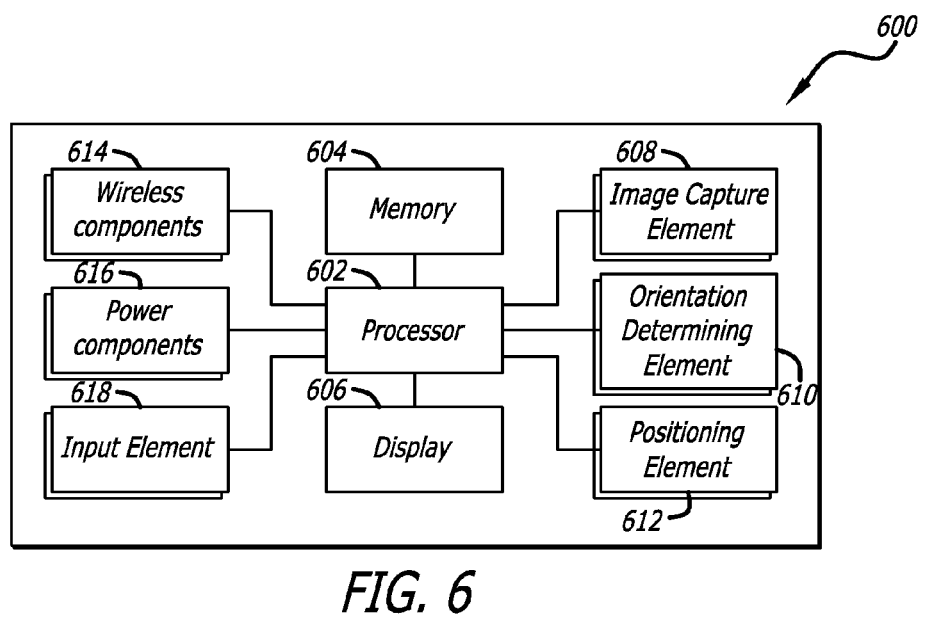
FIG. 6 illustrates example components that can be used with a device such as that illustrated in FIGS. 5A and 5B.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, text, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
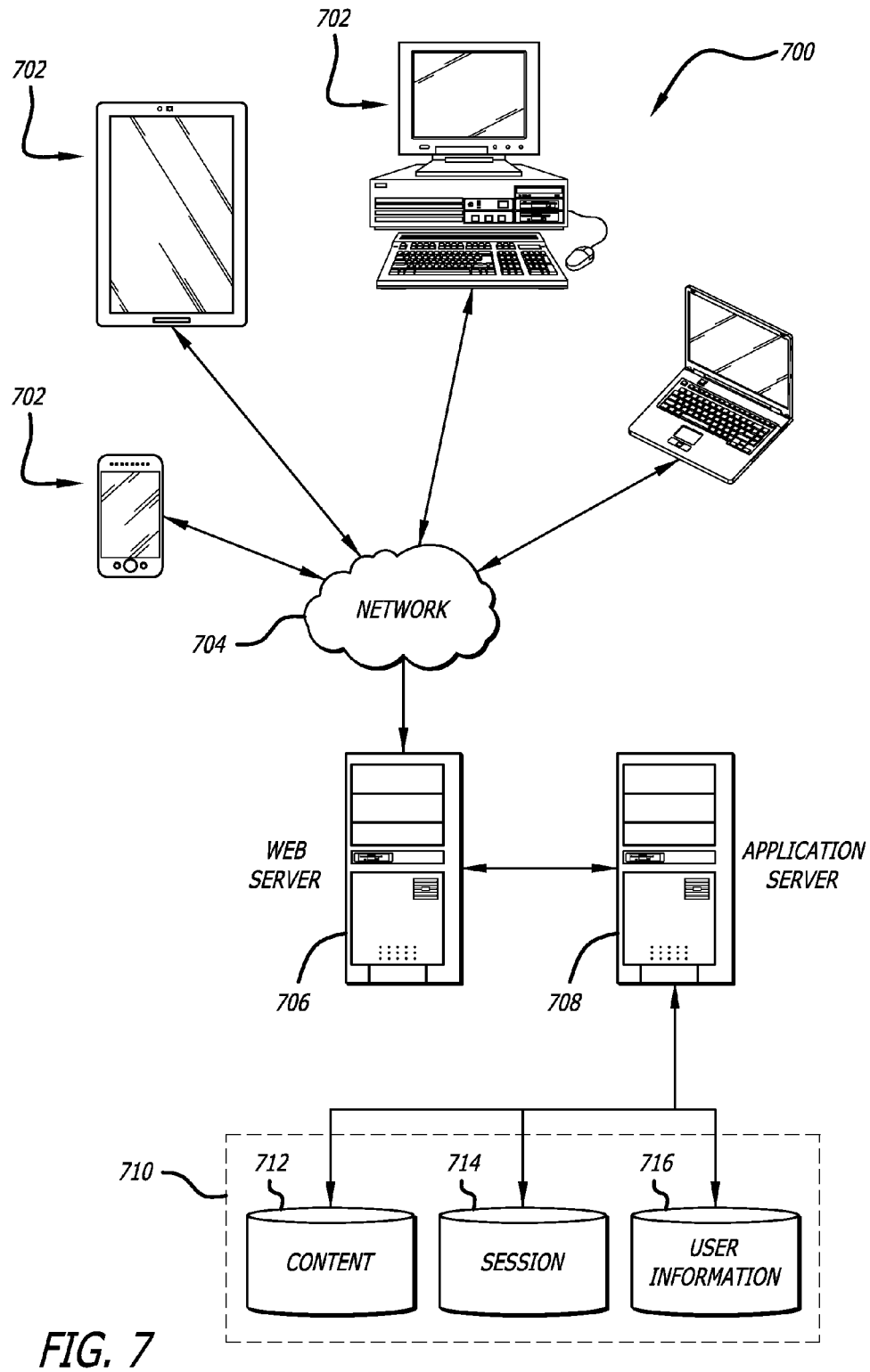
FIG. 7 illustrates another example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device

702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   generating a first text mask of an image captured with a camera of a computing device containing text including:
   identifying, using a first process, at least one region of the image containing the text and bypassing the first process for regions determined to be unlikely to contain text, such that the image includes at least one region not identified using the first process;
   iterating over each of a plurality of rows of the at least one region of the image containing the text to identify at least one maximally stable extremal region (MSER);
   upon identifying the at least one MSER, defining at least one horizontal text region including the at least one MSER by including a predetermined number of additional rows of pixels at least one of above or below rows of the plurality of rows containing the at least one MSER; and
   binarizing the at least one horizontal text region of the image to generate the first text mask of the image, wherein generating the first text mask of the image comprises identifying regions that are determined not to contain text, and printing the at least one region of the image containing text while omitting the regions that are determined not to contain text;
   generating a second text mask of the image including:
   identifying, using a second process, the at least one region of the image containing the text;
   iterating over each of a plurality of columns of the at least one region containing the text to identify the at least one MSER;
   eliminating false positive text indications in the plurality of columns by evaluating a stable pixel-to-length ratio associated with the plurality of columns;
   upon identifying the at least one MSER, defining at least one vertical text region adjacent the at least one MSER by including a predetermined number of additional columns of pixels including the plurality of columns containing the at least one MSER; and
   binarizing the at least one vertical text region of the image to generate the second text mask of the image;
   generating a final text mask of the image by combining the first text mask and the second text mask; and
   recognizing text according to the final text mask with a character recognition engine.

2. The computer-implemented method of claim 1, wherein the height of each pixel row is defined by a predetermined number of pixels.

3. The computer-implemented method of claim 1, wherein identifying the at least one region includes sampling the image to identify at least one of connected pixel regions of at least a predetermined size, chains of pixels of similar intensity, or at least three connected pixel regions within a determined distance.

4. The computer-implemented method of claim 1, further comprising:
   uniformly scanning the image at a first rate to identify connected pixel regions indicative of characters of text, wherein iterating over each of the plurality of rows and the plurality of columns includes scanning the respective identified at least one regions at a second finer rate.

5. A computer-implemented method, comprising:
   under the control of one or more computer systems configured with executable instructions,
   identifying at least one connected pixel region indicative of text by scanning each of a plurality of rows of at least a portion of an image to locate at least one transition between pixel values and bypassing the scanning for pixel regions determined to be unlikely to contain text, such that the image includes at least one region not identified by scanning;
   defining at least one first text region including a number of rows containing the at least one connected pixel region;
   defining at least one first padded text region including a predetermined number of rows adjacent the number of rows containing the at least one connected pixel region;
   generating a first text mask, wherein generating the first text mask comprises identifying regions that are determined not to contain text, and printing the at least one first text region while omitting the regions that are determined not to contain text;
   identifying the at least one connected pixel region indicative of text by scanning each of a plurality of columns of at least a portion of the image;
   eliminating false positive text indications in the plurality of columns by evaluating a stable pixel-to-length ratio associated with the plurality of columns;
   defining at least one second text region including a number of columns containing the at least one connected pixel region;
   defining at least one second padded text region including a predetermined number of columns adjacent the number of columns containing the at least one connected pixel region; and
   generating a second text mask of a combination of the at least one defined second text region and the at least one defined second padded text region to generate a consensus string of text.

6. The computer-implemented method of claim 5, further comprising:
   generating a combined text mask of the image by intersecting the first text mask and the second text mask.

7. The computer-implemented method of claim 6, further comprising:
   sending the combined text mask to a character recognition engine.

8. The computer-implemented method of claim 5, wherein the at least one connected pixel region is identified using a one-dimensional maximally stable extremal region (MSER) algorithm.

9. The computer-implemented method of claim 5, wherein the height of each row is defined by a predetermined number of pixels associated with at least one of a minimum and a maximum text size.

10. The computer-implemented method of claim 5, wherein the portion of the image is identified by sampling the image to identify at least one of connected pixel regions of at least a predetermined size, chains of pixels above or below a determined intensity, or at least three connected pixel regions within a determined distance.

11. The computer-implemented method of claim 10, further comprising:
    uniformly scanning the image at a first rate to identify the at least one connected pixel region indicative of text, and wherein scanning each of a plurality of rows of at least a portion of an image includes scanning the portion of the image at a second finer rate.

12. The computer-implemented method of claim 5, wherein the image is captured by at least one camera of a portable computing device and the image is one of a plurality of images of the text captured in a continuous mode.

13. A computing device, comprising:
a processor;
a display screen; and
memory including instructions that, when executed by the processor, cause the computing device to:
identify at least one connected pixel region indicative of text by scanning each of a plurality of rows of at least a portion of an image to locate at least one transition between pixel values and bypassing the scanning for pixel regions determined to be unlikely to contain text, such that the image includes at least one region not identified by scanning;
define at least one first text region including a number of rows containing the at least one connected pixel region;
define at least one first padded text region including a predetermined number of rows adjacent the number of rows containing the at least one connected pixel region;
generate a first text mask of a combination of the at least one defined first text region and the at least one defined first padded text region, wherein generating the first text mask comprises identifying regions that are determined not to contain text, and printing the at least one defined first text region while omitting the regions that are determined not to contain text;
identify the at least one connected pixel region indicative of text by scanning each of a plurality of columns of at least a portion of the image;
define at least one second text region including a number of columns containing the at least one connected pixel region;
eliminating false positive text indications in the number of columns by evaluating a stable pixel-to-length ratio associated with the number of columns;
define at least one second padded text region including a predetermined number of columns adjacent the number of columns containing the at least one connected pixel region; and
generate a second text mask of a combination of the at least one defined second text region and the at least one defined second padded text region to generate a consensus string of text.

14. The computing device of claim 13, wherein the instructions that, when executed by the processor, further cause the computing device to:
generate a combined text mask of the image by combining the first text mask and the second text mask; and
recognize text in the combined text mask with a character recognition engine.

15. The computing device of claim 14, wherein the height of each row is defined by a predetermined number of pixels associated with at least one of a minimum and a maximum text size.

16. The computing device of claim 13, wherein the at least one connected pixel region is identified using a one-dimensional maximally stable extremal region (MSER) algorithm.

17. A non-transitory computer-readable storage medium storing instructions that, when executed by at least one processor, cause a computing device to:
identify at least one connected pixel region indicative of text by scanning each of a plurality of rows of at least a portion of an image to locate at least one transition between pixel values and bypass the scanning for pixel regions determined to be unlikely to contain text, such that the image includes at least one region not identified by scanning;
define at least one first text region including a number of rows containing the at least one connected pixel region;
define at least one first padded text region including a predetermined number of rows adjacent the number of rows containing the at least one connected pixel region;
generate a first text mask of a combination of the at least one defined first text region and the at least one defined first padded text region, wherein generating the first text mask comprises identifying regions that are determined not to contain text, and printing the at least one defined first text region while omitting the regions that are determined not to contain text;
identify the at least one connected pixel region indicative of text by scanning each of a plurality of columns of at least a portion of the image;
define at least one second text region including a number of columns containing the at least one connected pixel region;
eliminating false positive text indications in the number of columns by evaluating a stable pixel-to-length ratio associated with the number of columns;
define at least one second padded text region including a predetermined number of columns adjacent the number of columns containing the at least one connected pixel region; and
generate a second text mask of a combination of the at least one defined second text region and the at least one defined second padded text region.

18. The non-transitory computer-readable storage medium of claim 17, wherein the instructions, when executed by the at least one processor, further cause the computing device to:
generate a combined text mask of the image by combining the first text mask and the second text mask; and
recognize text in the combined text mask with a character recognition engine.

19. The non-transitory computer-readable storage medium of claim 17, wherein the portion of the image is identified by sampling the image to identify at least one of connected pixel regions of at least a predetermined size, chains of pixels of similar intensity, or at least three connected pixel regions within a determined distance.

20. The non-transitory computer-readable storage medium of claim 19, wherein the instructions, when executed by the at least one processor, further cause the computing device to:
uniformly scan the image at a first rate to identify the at least one connected pixel region indicative of text, and wherein scanning each of a plurality of rows of at least a portion of an image includes scanning the portion of the image at a second finer rate.

21. The non-transitory computer-readable storage medium of claim 17, wherein the at least one connected pixel region is identified using a one-dimensional maximally stable extremal region (MSER) algorithm.

22. The non-transitory computer-readable storage medium of claim 17, wherein the height of each row is defined by a predetermined number of pixels associated with at least one of a minimum and a maximum text size.

* * * * *